Oct. 23, 1923.
J. PAFF
1,472,025
HORSESHOE AND CALK THEREFOR
Filed June 6, 1922
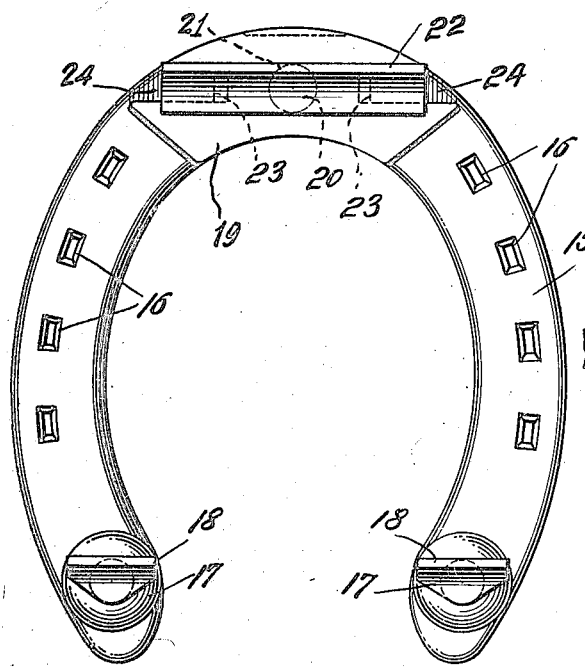
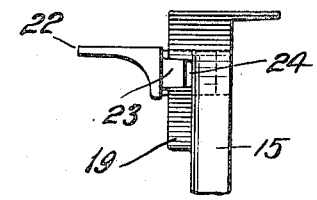
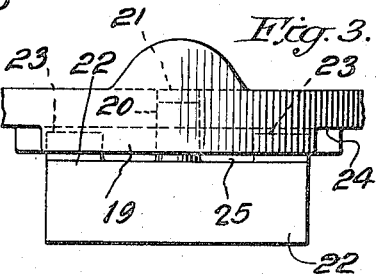
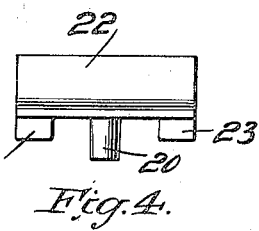
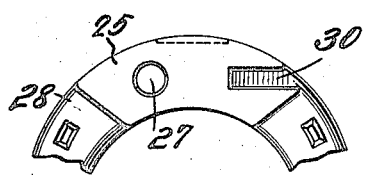
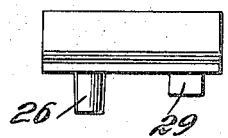
INVENTOR
John Paff
BY Archibald Coy
ATTORNEY Patented Oct. 23, 1923.

1,472,025

UNITED STATES PATENT OFFICE.

JOHN PAFF, OF ALLENTOWN, PENNSYLVANIA, ASSIGNOR TO BRYDEN-NEVERSLIP COMPANY, OF NEW BRUNSWICK, NEW JERSEY, A CORPORATION OF NEW JERSEY.

HORSESHOE AND CALK THEREFOR.

Application filed June 6, 1922. Serial No. 566,270.

*To all whom it may concern:*

Be it known that I, JOHN PAFF, a citizen of the United States, residing at Allentown, in the county of Lehigh and State of Pennsylvania, have invented new and useful Improvements in Horseshoes and Calks Therefor, of which the following is a specification.

The invention relates to an improvement in horseshoes of the replaceable calk type and to an improved toe calk therefor.

It has been proposed heretofore to provide horseshoes with replaceable toe calks of substantially the full width of the toe of the shoe. In spite of these prior efforts, the most common form of replaceable calk horseshoe now on the market is provided with two separate calks at the toe of the shoe. There are many disadvantages in the use of two replaceable calks at the toe of the shoe. Occasionally one of these toe calks will fall out and be lost with the result that the front portion or toe of the horse's hoof is supported at one side only. This imposes an undesirable strain on the horse's leg and sometimes causes stumbling, hence the desirability of providing the toe of the shoe with a single replaceable calk of substantially the full width of the toe. The object of the present invention is to produce an improved horseshoe of the replaceable calk type provided with an improved toe calk. The invention is more particularly concerned with the cooperating means on the shoe and the calk whereby the latter is held in place. It will be understood that when a horse is shod with shoes of the replaceable calk type, the wornout calks are taken from the shoes and replaced with fresh calks without removing the shoes from the horse's hoof. It is thus seen that not only must the replaceable calks be prevented from accidentally falling from the shoes while in use, but they must also be so constructed that they may be readily removed to be replaced with fresh calks. The improved horseshoe and replaceable toe calk of the present invention are so constructed that the calk may be readily removed for replacing by a fresh calk and yet will not accidentally fall out of the shoe, at least will be no more liable to do so than the replaceable toe calks as at present constructed. The invention is more fully described hereinafter and is particularly pointed out in the appended claims.

In the accompanying drawings illustrating the invention, Figs. 1 to 4 show the preferred form of the improved horseshoe and toe calk; Fig. 1 is a bottom plan of the horseshoe with the usual rear or heel calks and the improved front or toe calk in place; Fig. 2 is a side elevation of the toe end of the shoe shown in Fig. 1; Fig. 3 is a front elevation of the toe end of the shoe; and Fig. 4 is a rear side elevation of the improved front or toe calk; and Figs. 5 and 6 show a modified form of the toe end of the shoe and a modified form of calk therefor.

In its usual features of construction the improved horseshoe may be of any usual or preferred form and comprises a U-shaped body part 15 provided with the nail holes 16 and the replaceable rear calks 17 having tapered shanks adapting them to be driven into correspondingly tapered holes in the ends of the horseshoe. Before the calks 17 are driven home the edges 18 thereof may be set at any desired angle.

The front or toe end of the shoe is provided on its bottom side with a raised portion 19 which extends transversely across the full width of the toe of the shoe. The preferred form of the improved front or toe calk, as shown in Fig. 4, comprises a centrally arranged shank 20, preferably tapered, which is adapted to be driven into a correspondingly tapered hole 21 which pierces through the raised portion 19 and the toe of the body part 15 of the shoe. It will be observed by reference to Fig. 1 that the tapered hole 21 is arranged in substantially the middle of the toe of the shoe. The head part 22 of the improved calk is of such width as to extend substantially entirely across the toe of the shoe when it is in place, as shown in Fig. 1. By providing the toe of the horseshoe with a single calk, no twisting strain is imposed upon the leg of the horse in case the calk should become loosened and fall out of the shoe. It is seldom that a horseshoe calk having a tapered shank driven into a tapered hole in the horseshoe becomes loosened in use and falls out. This sometimes occurs, however, and hence it is desirable to provide the shoe with a single wide calk rather than with two small ones.

To prevent the single front or toe calk of the invention from turning while in the shoe, the preferred form of calk is provided with two lugs or bosses 23 projecting downwardly from the ends of the bottom of the head 22 of the calk. The lugs 23 are adapted to be received in corresponding grooves or recesses 24 formed in the raised portion 19 and extending from the outer ends thereof inwardly toward the tapered hole 21, as clearly shown in Fig. 1. The tapered hole 21 in the horseshoe and the tapered shank 22 of the calk are so proportioned that when the calk is first driven home, it occupies the position, relatively to the horseshoe, shown in Figs. 2 and 3. That is to say, a space separates the bottom of the recesses 24 from the bottom of the lugs 23 and a space 25 separates the bottom of the head of the calk from the raised portion 19. This permits the shank to enter more deeply into the hole in the horseshoe under the pounding the calk receives while in use. When the toe calk is worn out it may be removed by inserting a tool in the space 25 as close as convenient to the shank 20. The removal of the wornout calk from the shoe is facilitated by so proportioning the parts that when the calk is fully driven in, a narrow aperture will separate the bottom of the head of the calk from the adjacent surface of the raised portion 19. It is thus seen that the present construction embodies the full advantages of a tapered shank replaceable calk while at the same time providing a ready means for removing the calk when worn out.

In the modified form of the invention shown in Figs. 5 and 6, the tapered shank 26 is located at one end of the calk and is adapted to be driven into a correspondingly tapered hole 27 located in one side of the toe of the horseshoe 28. The raised portion 25 extending across the bottom of the toe of the shoe 28 is provided with a groove or recess 30 which extends from one end of the raised portion 25 inwardly toward the hole 27. The lug 29 projecting downwardly from one end of the bottom of the calk shown in Fig. 6 is adapted to be received in the recess 30 in the same manner in which the lugs 23 are adapted to be received in the recesses 24.

Having thus described the invention what I claim as new is:—

1. A horseshoe of the replaceable calk type comprising a U-shaped part having a raised portion extending across the bottom of the toe of the shoe, there being a tapered hole extending through the raised portion and the body part of the toe and a groove or recess formed in the raised portion and extending from the outer end of the raised portion inwardly toward the tapered hole, and a replaceable toe calk consisting of a head of substantially the full width of the toe of the shoe and a tapered shank adapted to be driven into the tapered hole, the bottom of the head being provided with a lug adapted to be received in the recess to prevent the calk from turning, the parts being of such proportion that when the calk is in place, a space separates the bottom of the head from the adjacent surface of the raised portion to permit the insertion of a tool to remove the calk.

2. A horseshoe of the replaceable calk type comprising a U-shaped part having a raised portion extending transversely across the bottom of the toe of the shoe, there being a centrally arranged tapered hole in the raised portion and extending through the body part of the toe and two recesses formed in the raised portion and extending from the outer ends thereof inwardly toward the tapered hole, and a calk consisting of a head arranged parallelly with the raised portion and a tapered shank adapted to be driven into the tapered hole, the bottom of the head being provided on each lateral side of the head with a lug adapted to be received in the corresponding recess in the raised portion, the parts being of such proportion that when the calk is in place a narrow aperture separates the bottom of the head from the adjacent surface of the raised portion to permit the insertion of a tool to remove the calk from the shoe.

JOHN PAFF.